Aug. 26, 1958 L. R. ZIFFERER 2,848,808
TRIMMING DEVICE FOR LAWNS AND HEDGES
Filed May 22, 1956 4 Sheets-Sheet 1

INVENTOR.
Lothar Robert Zifferer,
BY Paul & Paul
ATTORNEYS

Aug. 26, 1958     L. R. ZIFFERER     2,848,808
TRIMMING DEVICE FOR LAWNS AND HEDGES
Filed May 22, 1956     4 Sheets-Sheet 2
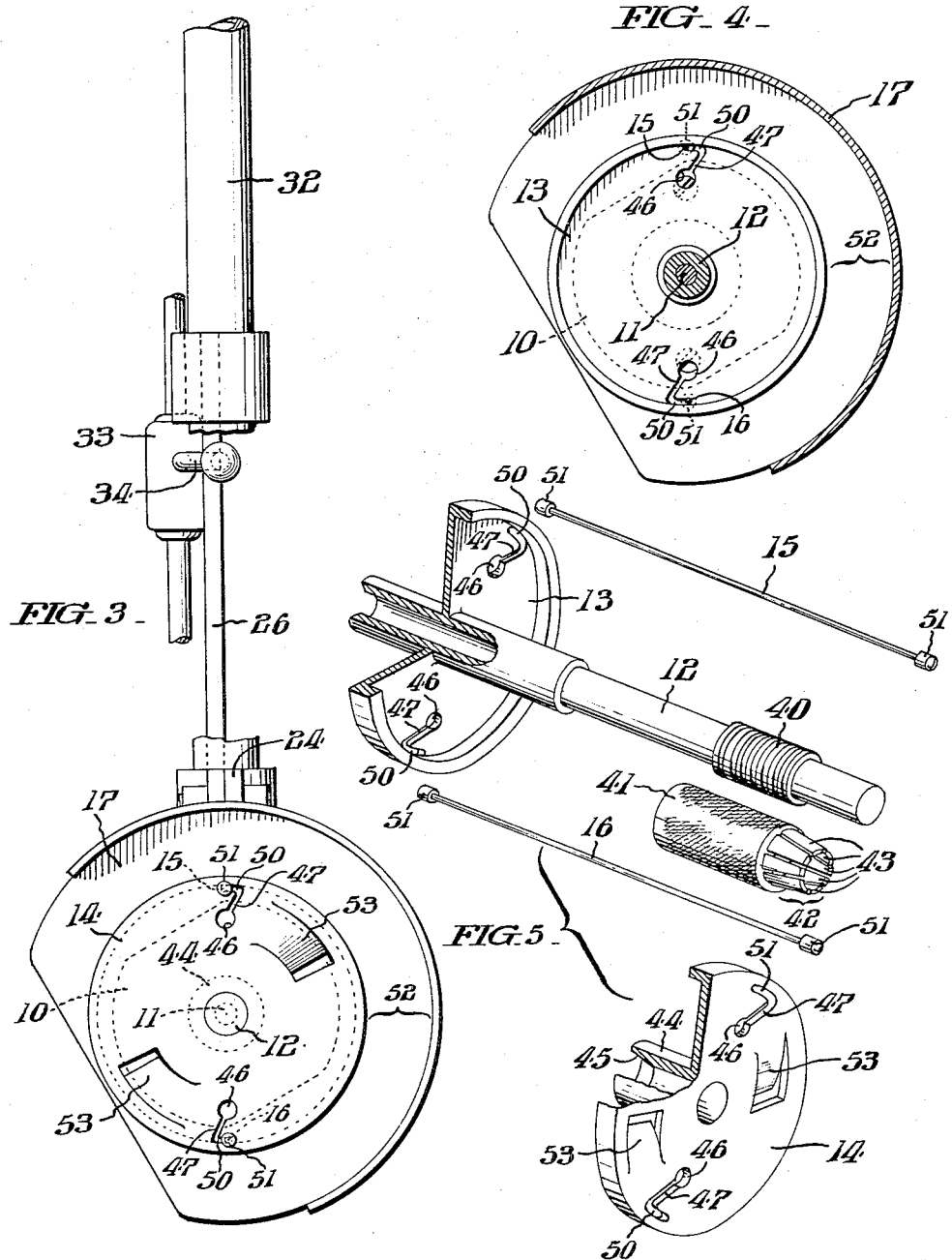
INVENTOR.
Lothar Robert Zifferer
BY Paul & Paul
ATTORNEYS

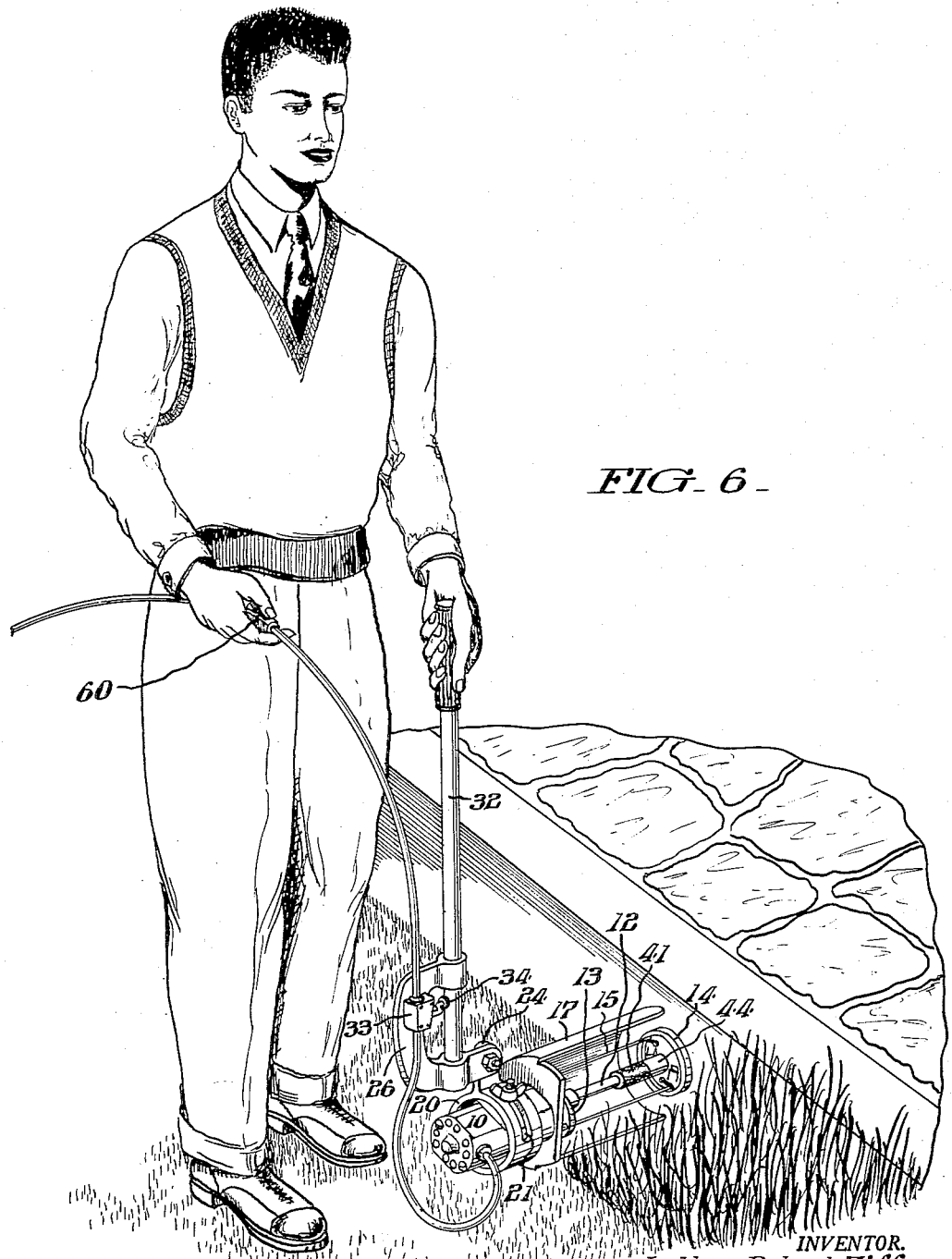

Aug. 26, 1958 — L. R. ZIFFERER — 2,848,808
TRIMMING DEVICE FOR LAWNS AND HEDGES
Filed May 22, 1956 — 4 Sheets-Sheet 4

INVENTOR.
Lothar Robert Zifferer,
BY Paul & Paul
ATTORNEYS

United States Patent Office 2,848,808
Patented Aug. 26, 1958

2,848,808

TRIMMING DEVICE FOR LAWNS AND HEDGES

Lothar Robert Zifferer, Mount Joy, Pa.

Application May 22, 1956, Serial No. 586,510

11 Claims. (Cl. 30—124)

This invention relates to a trimming device, and more particularly concerns a device for trimming the edges of lawns, the tops and sides of hedges, and the like.

It is an object of this invention to provide an edge trimming device for lawns and the like which is easily manipulated in a variety of positions, which is safe to operate, and which is inexpensive.

Another object is to provide a lawn edge trimmer which does not require sharpening and which has cutting elements that are readily replaceable.

Still another object of this invention is to provide a lawn edge trimmer which also trims hedges with equal facility.

Still another object of this invention is to provide a lawn edge trimmer which has capacity to trim completely over to an obstruction such as a wall or the like, and which reduces the trimmings to fine particles which do not require raking or sweeping.

Other objects and advantages of this invention, including the mechanical convenience, stability and ruggedness of the same, will further appear hereinafter and in the drawings, of which:

Fig. 1 is a view in side elevation, partially shown in section, illustrating a preferred form of a trimming device embodying features of this invention.

Fig. 2 is an end view of a trimmer as disclosed in Fig. 1, looking toward the back of the motor which drives the trimmer.

Fig. 3 is an end view comparable to Fig. ,2 but looking at the front of the trimmer.

Fig. 4 is a sectional view taken as indicated by the lines and arrows IV—IV which appear in Fig. 1.

Fig. 5 is an exploded view of the trimmer portion of the device, illustrating the separate parts and how they are assembled and taken apart.

Fig. 6 is a view in perspective illustrating how the trimmer can be operated to trim grass completely over to a wall.

Figure 7:
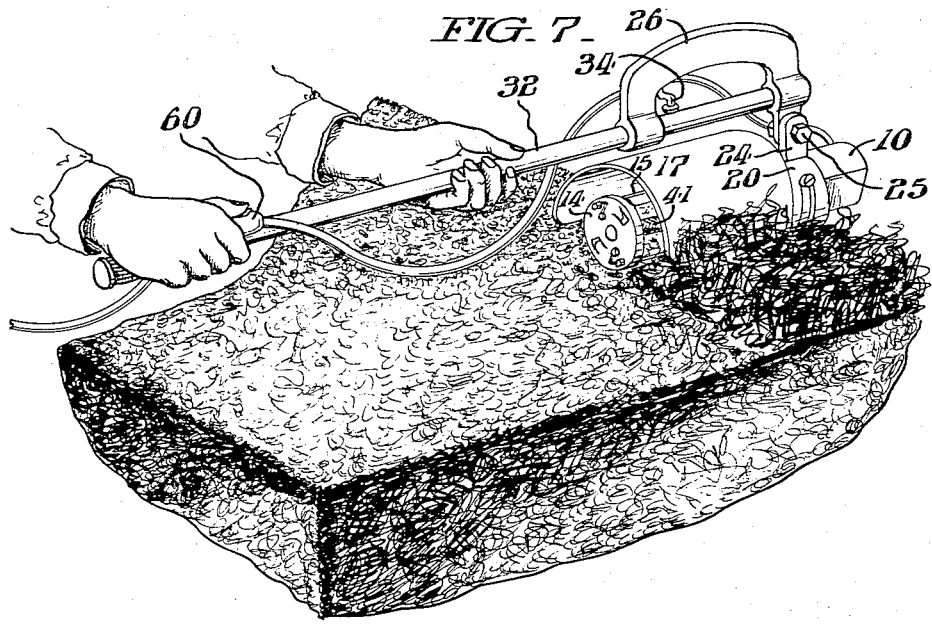
Fig. 7 is a view in perspective illustrating how the device may be utilized for trimming a hedge, using a long-arm handle.

Turning now to the specific embodiment of the invention selected for illustration in the drawings, the trimming device shown therein comprises generally a high-speed electric motor 10 having a shaft 11 to which is secured a trimmer shaft 12 having at its ends a pair of inner and outer discs 13, 14 and a pair of wires 15, 16 extending under tension between them. A guard 17 is secured to the motor 10.

The motor 10 carries a ring 20 provided with an elongated slot 21. A threaded bolt 22 attached to the motor 10 extends through the slot 21, permitting limited circumferential shifting movement of the ring 20 with respect to the motor 10. A wing nut 23 is provided on the threaded bolt 22 to secure the ring 20 in adjusted position.

The ring 20 carries a pivot arm 24 having a pivot 25 connected to a curved handle 26. The axis of pivot 25 is substantially perpendicular to the axis of shaft 12. Handle 26 has a pair of aligned circular openings 30, 31 (see particularly Fig. 8) for receiving and retaining the end of a long-arm handle 32. An electric switch 33, which is normally open and self-opening, is secured to the handle 26. As appears in particular detail in Fig. 1, the switch 33 has an actuating button 34 which is automatically depressed by the long-arm handle 32 when said handle 32 is positioned within the openings 30, 31. The depression of the button 34 closes the switch 33.

It will accordingly be appreciated that means are provided whereby the guard 17 (and motor 10) may be turned circumferentially with respect to the ring 20 and pivot 25. Also, the handle 26 as well as the handle 32, if used, may be swung reversibly in a plane parallel to the axis of the trimmer shaft 12, about the pivot 25.

Referring now in more particular detail to the trimmer portion of the device as shown in Figs. 1 to 5, the shaft 12 has a threaded portion 40 intermediate its ends. An internally threaded, knurled sleeve 41 is threadedly engaged with the threaded portion 40. The knurled sleeve 41 has a tapered, split cone 42 at its end, forming a plurality of compressible segments 43. The outer disc 14 has a cylindrical sleeve 44 which fits over the free end of the shaft 12. The sleeve 44 is internally tapered at 45 at an angle to compress the segments 43 against the end of the shaft 12.

The outer disc 14 has a pair of diametrically opposed cylindrical bores 46, 46, outwardly angularly extending slots 47, 47, and circumferentially disposed slot end passages 50, 50. Each wire 15, 16 has an enlarged end 51 which is just small enought to fit through the corresponding hole 46 but too large to fit through either slot portion 47 or 50. The inner disc 13 is similarly provided with members 46, 47 and 50, and the wires have corresponding end portions 51. It will accordingly be appreciated that the wires 15, 16 may be assembled to the outer disc 14 by backing sleeve 41 toward inner disc 13, connecting wires 15, 16 to inner disc 13 by inserting end portion 51 through the holes 46 and then shifting the wire outwardly along the slot 47 and circumferentially along the slot portion 50 to the end of said portion, placing outer disc 14 on the end of shaft 12, and inserting the wire end portions 51 in disc 14 as just described. After the wires are thus assembled, the knurled sleeve 41 is turned on the threaded portion 40, displacing the outer sleeve 14 slightly away from the inner sleeve 13, thereby tensioning the wires 15, 16. When the motor is energized and the discs 13, 14 are revolved at high speed, the centrifugal forces of the central portions of the wires 15, 16 tend to draw the discs 13, 14 together, thereby applying additional tension and stabilizing the entire structure.

The slotted end portions 50 extend circumferentially in a direction opposite to the direction of rotation of the discs, whereby the rotation of the discs tends to seat the wires 16 at the ends of the slot portions 50.

From Figs. 3 and 4 it will be appreciated that a considerable space 52 is provided between the outer edges of the discs 13, 14 and the inner surface of the guard 17. The outer disc 14 is provided with a pair of vanes 53, 53 which are arranged to create a strong flow of air from the inner disc 13 outwardly toward the outer disc 14. This flow of air blows the clippings created by the revolving wires 15, 16 outwardly through the space 52 and prevents those clippings from clogging up the cutters or the apparatus which operates the trimmer.

Referring to Fig. 6 of the drawings, it will be observed that the apparatus of this invention is ideally suited as an edge trimming device when the long-arm handle 32 is applied. The electric wire which energizes the motor 10 is provided with a remote switch 60 which is normally open and which must be depressed by the operator in order to energize the motor. This assures that the operator's hand is not in close proximity to the revolving wires, thereby assuring safety of operation. The long-arm handle 32 is held in the operator's other hand, and it automatically depresses the electric switch 33, as heretofore explained.

Fig. 7 shows that the device as illustrated in Fig. 6 may readily be converted into a hedge trimming apparatus, simply by swinging the long-arm handle 33 about the pivot 25, and by swinging the guard 17 circumferentially with respect to the pivot 25.

Figure 8:
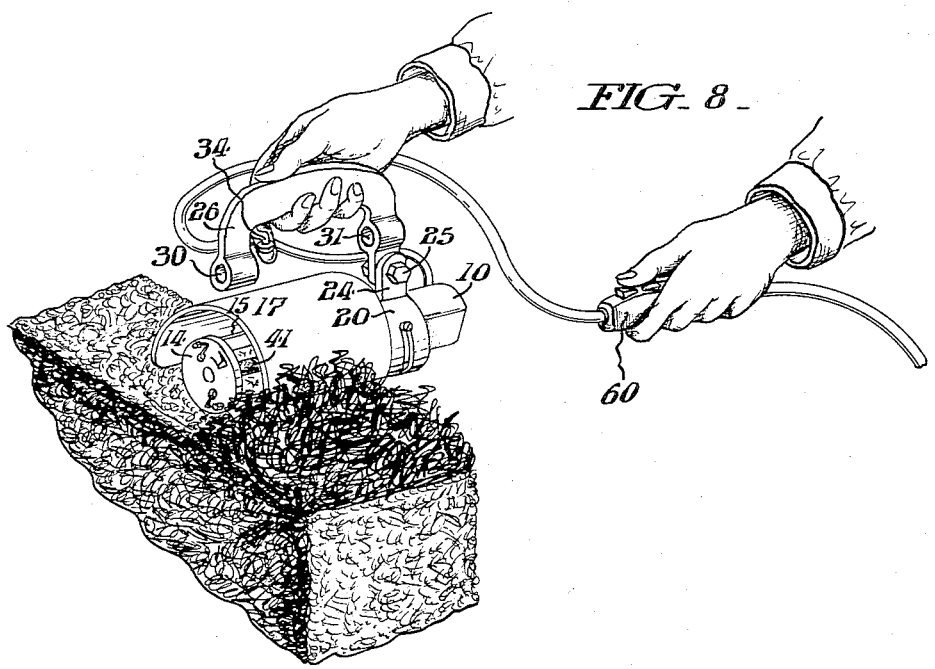
Fig. 8 is a view in perspective illustrating how the device may be used as a hedge trimmer, without the long-arm handle.

Fig. 8 shows how the apparatus is used for clipping a relatively small hedge, wherein the long-arm handle 32 is removed from the cylindrical openings 30, 31, and wherein the operator depresses the electric switch button 33 with one hand while he depresses the remote switch 60 with the other hand. This arrangement again insures safety of operation, since the operator must depress both switches in order to operate the motor 10 and the trimming device as a whole.

It will accordingly be appreciated that the trimming device of this invention may readily be assembled at low cost, and that it is light in weight. The wires 15, 16 cut grass or hedge growth by revolving at high speed, and they require no sharpening. The wires are easily replaceable at negligible cost. The apparatus of this invention is self-clearing since fan means are provided for creating a strong current of air which automatically removes the clippings as they are formed. Additionally, the trimmer of this invention is readily adapted to trim a lawn, the edge of a lawn, or large or small hedges with equal facility.

The particular construction and arrangement of the attaching means for securing the wires 15, 16 to the discs 13, 14 is of importance. Should a wire break in service, its ends are anchored in the slots 47, 50 and the broken wire does not fly off.

It is of particular importance that the apparatus of this invention has the ability to cut up to the very edge of an obstruction such as a concrete walk, wall or the like. The outer disc 14 protects the wire cutting elements from damage, since the disc 14 contacts the concrete walk first. In view of its circular form, the disc does not strike obstructions with great impact, as is the case in other types of grass cutting equipment. The disc merely rotates on the obstacle, and even if a rock is struck, the outer disc merely revolves on or against the rock and is not subjected to any substantial impact. This feature not only protects the cutters but also the bearings and other parts of the driving mechanism.

A further advantage of the invention as disclosed herein is that the revolving wires do not cut the electric cord, should they accidentally be brought against the cord. Many existing power driven trimming devices have cutters which immediately cut the cord and de-energize the entire apparatus. The wires 15, 16 merely scuff the surface of the electric cord but do not cut it.

The trimming device of this invention, when utilized for trimming the green portion of a hedge, disintegrates the clippings and there is no need to rake them up after the trimming operation is completed. The same result is achieved when trimming grass, which is distintegrated and distributed over the lawn as a mulch by the apparatus of this invention.

Although this invention has been described with reference to a specific embodiment thereof, it will be appreciated that various modifications may be made without departing from the spirit or scope of this invention. For example, equivalent elements may be substituted for those shown and described, parts may be reversed, and certain features of the invention may be used independently of other features, all within the spirit and scope of this invention as defined in the appended claims.

Having thus described my invention, I claim:

1. In a portable rotary cutting machine driven by a rotary power means, the combination which comprises a pair of discs carried on the ends of a rotatable shaft, a wire extending under tension between said discs, said wire being located near the outer periphery of said discs and arranged to follow a substantially cylindrical path about the axis of said shaft, one of said discs including a fan blade in the face thereof, whereby said fan blade creates a current of air when said wire is rotated about said shaft, clearing the cuttings from the vicinity of said shaft.

2. The combination defined in claim 1, wherein said fan blade is arranged at an angle to said shaft to create said current of air in a direction outwardly from one disc to and beyond the other.

3. The combination defined in claim 2, wherein a guard cover member is spaced from the peripheral edges of said discs, and wherein said fan blade is constructed and arranged to displace said air and clippings through the intervening space.

4. In a portable rotary cutting machine including a motor having a rotatable motor shaft, the combination which comprises a rotating arm forming an extension of said shaft and fixed relative thereto so that said arm rotates with said shaft, a fixed disc mounted on said arm, an axially shiftable disc mounted on said arm and spaced away from said fixed disc, means restraining said shiftable disc from turning relative to said fixed disc, a wire connected between said discs and arranged substantially parallel to said arm, and tensioning means carried by said arm in contact with said shiftable disc to shift said disc axially to apply tension to said wire.

5. The combination defined in claim 4, wherein one of said discs includes a fan blade which creates a current of air directed away from said motor.

6. The combination defined in claim 4, wherein said wire is provided with an enlarged head at each end, and each disc is provided with an aperture large enough to pass the head associated therewith, said aperture having a generally outwardly extending slot narrower than said head extending from said aperture away from the axis of said arm, a circumferential channel narrower than said head connected to said outwardly extending slot and extending generally circumferentially away from the juncture of said channels and in a direction opposite the direction of rotation of said discs, whereby said wire is readily replaceable but its ends are anchored should said wire break in service.

7. A trimming device comprising a shaft, a disc fixed to said shaft, said shaft having a threaded portion intermediate its ends, said threaded portion being adjacent one end of said shaft, a threaded sleeve engageable with said threaded portion for adjustment axially along said shaft, a shiftable disc mounted free on the shaft end adjacent the end of said threaded sleeve, and a plurality of circumferentially spaced wires extending substantially parallel to said shaft from one disc to the other.

8. The trimming device defined in claim 7, wherein said sleeve has a generally conical compressible end portion in the form of a plurality of spaced segments, and wherein the shiftable disc has a conical portion arranged to contact said compressible end portion.

9. A portable rotary cutting machine including a rotatable shaft, a rotating member forming an extension of said shaft and fixed relative thereto so that said member rotates with said shaft, a fixed disc mounted on said member, an axially shiftable disc mounted on said member and spaced away from said fixed disc, means restraining said shiftable disc from turning relative to said fixed disc, a wire connected between said discs and arranged substantially parallel to said member, and tensioning means carried by said member in contact with said shiftable disc to shift said disc axially to apply tension to said wire.

10. A cutting tool comprising a drive shaft, a plurality of thin, flexible cutting elements, means for mounting the cutting elements on the drive shaft for rotation therewith, the cutting elements being substantially parallel to the drive shaft and spaced therefrom and from each other, and means connecting the drive shaft to a source of power.

11. A cutting tool comprising a drive shaft, a thin, flexible cutting element, means for mounting the cutting element on the drive shaft for rotation therewith, said cutting element being substantially parallel to the drive shaft and spaced therefrom, and means connecting the drive shaft to a source of power.

No references cited.